(12) United States Patent
Stoeckler

(10) Patent No.: US 7,104,718 B2
(45) Date of Patent: Sep. 12, 2006

(54) SCISSOR-TYPE CONNECTOR WITH CONNECTOR BODY FOR THE ROOF SUPPORT OF A COLLAPSIBLE TENT

(76) Inventor: Heinz Stoeckler, Frohwiesstrasse 37, Ruti, ZH (CH), CH-8630

( * ) Notice: Subject to any disclaimer, the term of this patent is extended or adjusted under 35 U.S.C. 154(b) by 0 days.

(21) Appl. No.: 10/306,930

(22) Filed: Nov. 27, 2002

(65) Prior Publication Data

US 2004/0101352 A1 May 27, 2004

(51) Int. Cl.
*E04M 15/50* (2006.01)

(52) U.S. Cl. .................. 403/119; 403/389; 411/508; 411/509

(58) Field of Classification Search ............ 411/508, 411/509; 403/396, 388, 119, 340, 329, 330, 403/286, 389
See application file for complete search history.

(56) References Cited

U.S. PATENT DOCUMENTS

| | | | | |
|---|---|---|---|---|
| 4,373,826 A | * | 2/1983 | Inamoto et al. | 411/508 X |
| 4,495,380 A | * | 1/1985 | Ryan et al. | 411/508 X |
| 4,524,494 A | * | 6/1985 | Sato et al. | 411/508 X |
| 6,042,296 A | * | 3/2000 | Wittig et al. | 411/509 X |

FOREIGN PATENT DOCUMENTS

DE  198-41-596 A1  4/1999

* cited by examiner

*Primary Examiner*—John R. Cottingham
(74) *Attorney, Agent, or Firm*—Gene W. Arant

(57) ABSTRACT

A scissor-type connection for the roof support of a collapsible tent, having two rails rotatable relative to each other around an axle, one of the rails having a spring body that lockably engages an opening in the other.

4 Claims, 3 Drawing Sheets

SCISSOR-TYPE CONNECTOR WITH CONNECTOR BODY FOR THE ROOF SUPPORT OF A COLLAPSIBLE TENT

CROSS REFERENCE TO RELATED APPLICATION

The application is a continuation of PCT patent application No. PCT/CH01/00350 filed on Jun. 7, 2001. The priority of the prior application is expressly claimed and its disclosure is hereby incorporated by reference in the entirety.

The invention describes a scissor-type connector on a support profile for a collapsible tent according to the preamble of the first claim.

Such tents are as an example described in EP-A-0 514 574 and are also known under the Trademark "Pro*Tent". A design with six edges has been described in the Swiss Patent Application No. 0986/97 of 02 May 1997 to which the present invention applies as well.

So far screws with nuts and disks were used in support or rotating axles, which design had to fulfill two purposes, namely as connection of both scissor supports to each other and also to allow a rotation movement of both scissor supports relative to each other. In order to prevent, that the screw-nut connection would loosen due to the rotating movement, the screws were mostly glued onto the nut. For this rotating connection, screws of a special design were needed, which as a consequence were correspondingly expensive and heavy. For that reason the screws and nuts for a single tent had a weight of several kilos. The assembly of these screws with nuts and disks as well as the handling these parts for satisfactory rotation, was rather time consuming, and caused further addition to the costs.

Since the screw holes went through both opposite profile walls, the square profile were weakened considerable at the hole location. Such weakness can easily lead to fractures, when exposed to strong wind.

The screw connections furthermore were visible through the tent roofs and thereby damaged the general appearance of the tent.

In order to prevent the drawbacks of the prior art design, a solution of the kind was sought, that is described in German Patent Application No. 188 41 696.4. This solution uses an body of a type, that is radially divided in four portions. This design has the disadvantage, that—although it can be pressed through the hole in the rail—it easily tends to work itself out of the hole In the rail, so that the connection Is interrupted.

The four-edge rail used so far had a height about twice the width of the rail. It was now tried to find a possibility to increse the strength of the rail without any increase in the weight of the rail.

The object of the invention, therefore, is to develop a scissor-type connection, which does not possess the disadvantages of the prior art.

The design to be created should include the rail as well as the connector body or element and should be more stable and have a longer useful life than the prior art design, but the purpose is primarily to develop a cost-saving design, that is assembled in a minimum of time. The solution looked for has the purpose of reducing assembly and material costs to a fraction of the costs connected with the prior art.

A further purpose of the solution searched for is a substantial weight reduction of the scissor connection as compared with the prior art design. The weight reduction looked for Is important for the reason, that collapsible tents of this design are moved very often from one site to another. Since such tents are carried in a bag, as from a garage to a garden, the weight thereof is of great importance. This is in particular important, if such bag has to be carried by a person with spinal problems. The non-use of screws and nuts causes a weight reduction of several kilos.

It is planned to use the connector element together with the rails used earlier as well as with the those shown in this application.

The object referred to has been been accomplished by the features listed in the characterizing portion of the first claim.

Embodiments of the invention have been described in the dependent claims.

The omittance of the screws, nuts and disks used in the prior art design has caused a weight reduction of the tent of several kilos.

The inventive design is not only weight-reducing, but reduces also the assembly costs for the connection as well as production costs considerably.

An embodyment of the inventive scissor-type connection is described below with reference to the drawing, in which.

Figure 1:
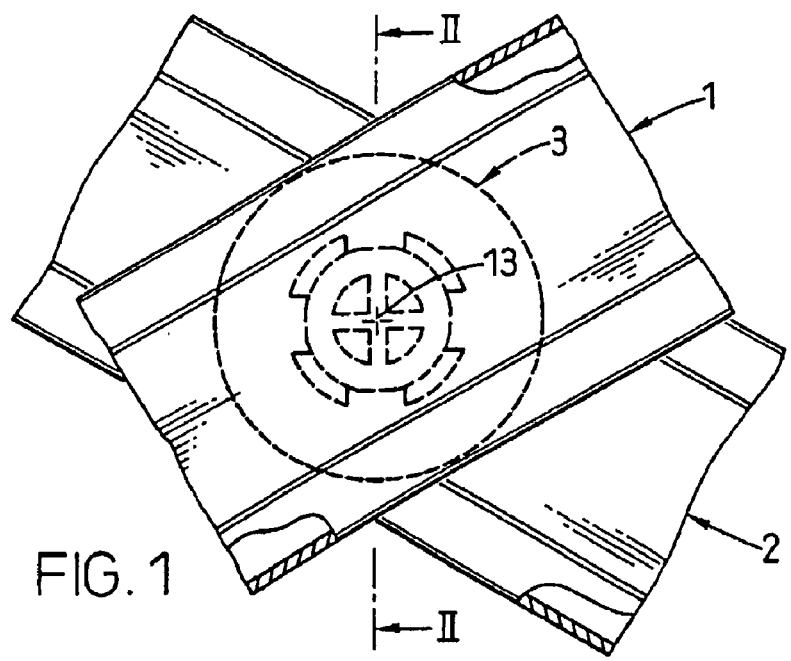
FIG. 1 shows a connection between two rails in axial direction.
Figure 2:
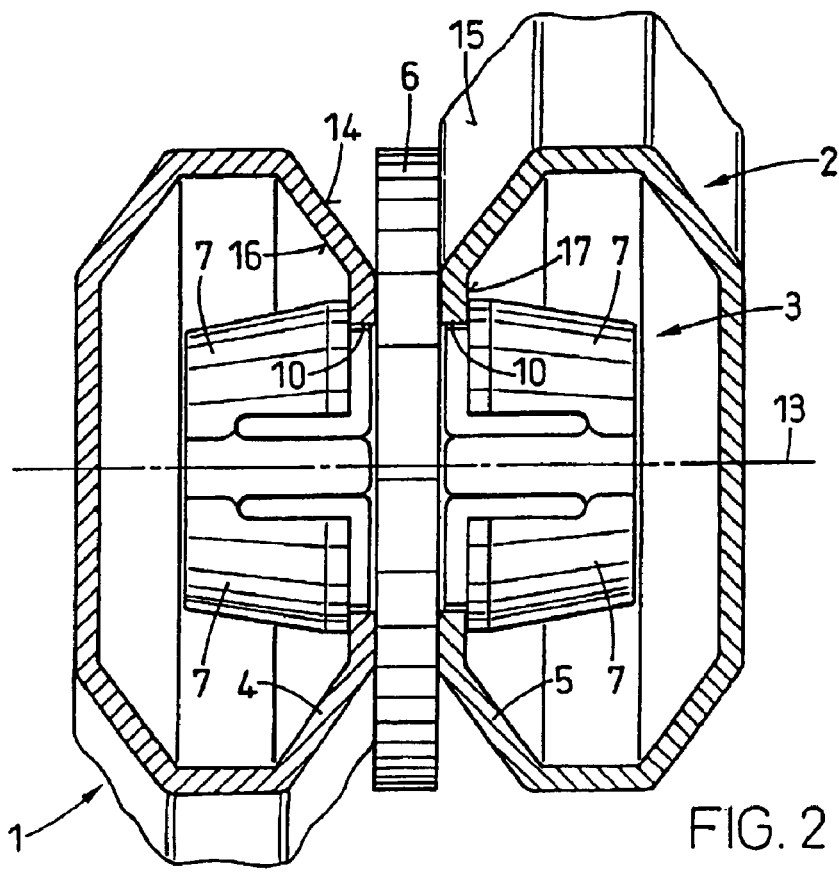
FIG. 2 shows a view in the direction of the arrow II in FIG. 1.
Figure 3:
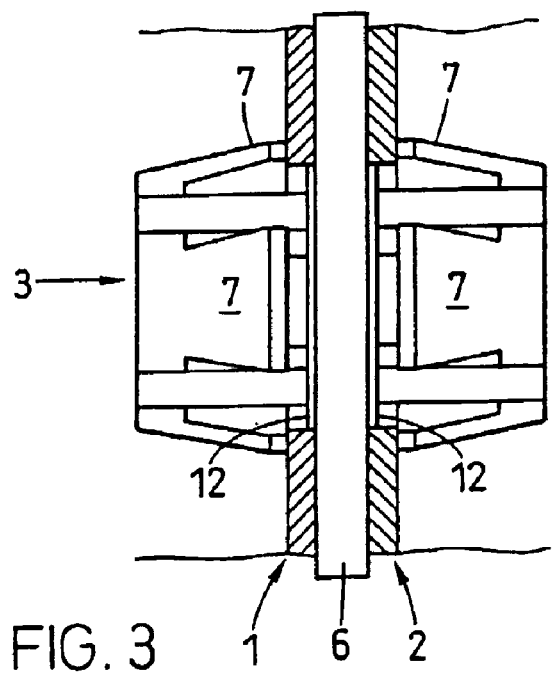
FIG. 3 shows a detail of the connection in FIG. 2.
Figure 5:
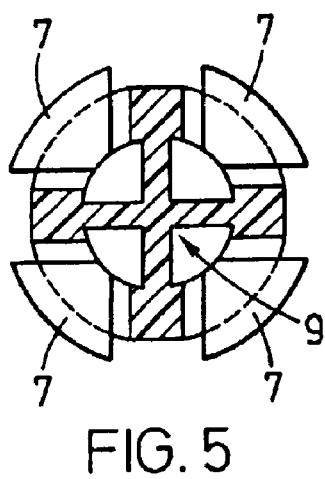
FIG. 5 shows a section along the line V—V in FIG. 4.
Figure 4:
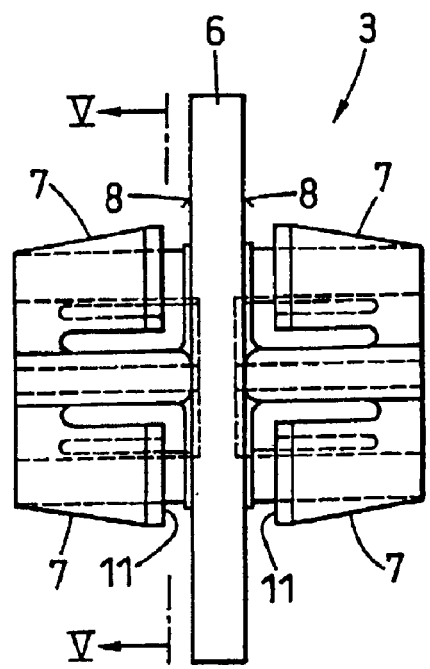
FIG. 4 shows a side view of the connector in FIG. 3.
Figure 6:
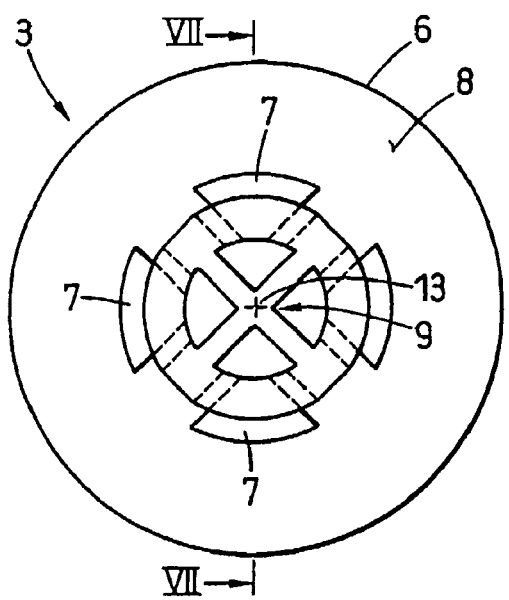
FIG. 6 shows an end view of the connector.
Figure 7:
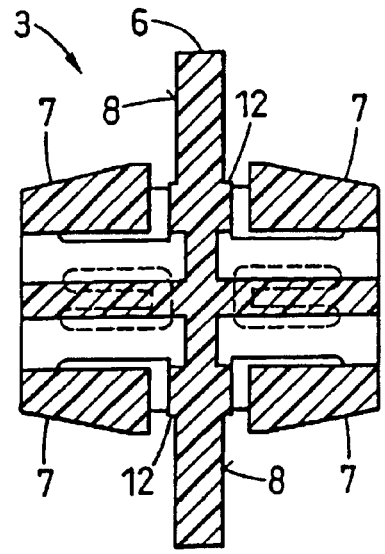
FIG. 7 shows a section along the line VII—VII in FIG. 6.
Figure 8:
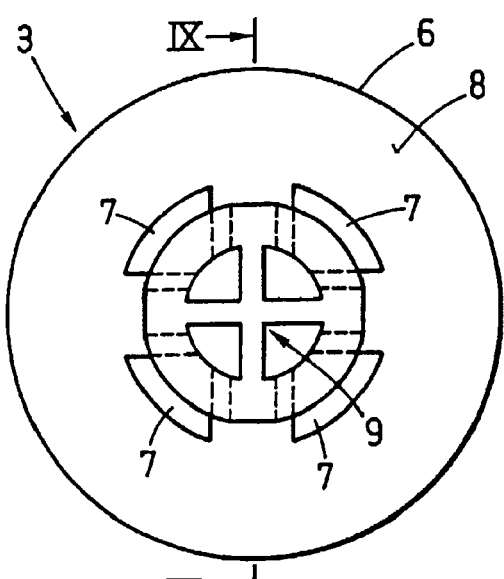
FIG. 8 shows a view similar to FIG. 6, rotated by 45°.
Figure 9:
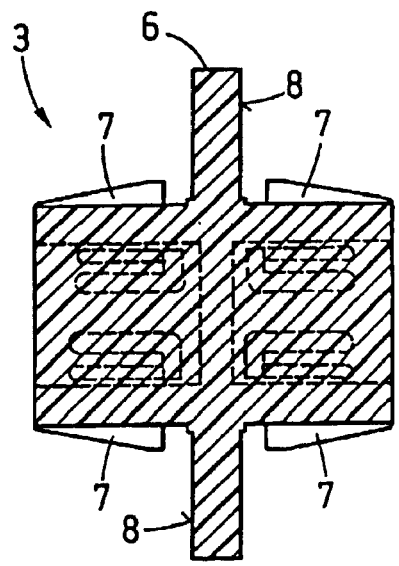
FIG. 9 shows a section along the line IX—IX in FIG. 8.

FIG. 1 shows a schematic end view of a connection between two rails 1 and 2 by means of a connector body 3, which connects one wall 4, 5 of each of both rails 1, 2. On both sides of a middle disk 6 the connecting body 3 has four integrated spring bodies 7. At the outer end there is a round disk 8, that is provided with a strengthening cross 9.

Upon assembling of the scissor-type connector, both rails 1, 2, which are provided with corresponding dimensioned holes 10, are pushed from the outside over the end of the connector body 1, causing the spring body 7 to be pressed together and expanding afterwards, so that the rail walls 4, 5 comes to lay between the middle disk 6 and the inner edge 11 of the spring body 7. The middle disk 6 has on both sides a disk-shaped projection 12, which corresponds more or less to the inner diameter of the hole 10 in the rail 1, 2. This disk-shaped projection 12 serves as bearing for the rails 1, 2 when the tent is raised or collapsed.

The operation of the connecting body 3 is based on the fact, that it is made from flexible plastic, that firstly possesses sufficent elastic qualities and secondly a high resistance against abrasion. At the same time the connecting body 1 has a high strength, that prevents the scissor-type connection from loosening.

In comparison with the prior the art design the present invention has the advantage, that the assembly procedure is easier and much faster.

The described connecting body can be used together with the prior art design with a square rail profile (12×24 mm), but—contrary to the existing design—only one hole in one rail wall is needed, a fact that improves the strength of the connection in this area.

With reference to the connecting body described, efforts were made to find or develop a profile or rail with higher strength and despite thereof with the same or less weight, as compared with the prior art square rail.

This effort led to a rail or profile with eight edges possessing the same weight and larger surface but lower wall thickness, and with 30% higher strength (angular impulse) than the four-edge or square rail. It is further pointed out, that the critical point of strength lies in the area of the holes through opposite walls. Since in the new design only one rail wall has a hole, the strength in this critical area is heavily increased.

With the new connecting body and the new rail it is possible to increase the strength in the critical area many-fold.

The loosening of a connection between two rails is—without damaging the connecting body—almost impossible, such damage cause, however, only minor financial losses.

Normally, the rails are made of light metal—preferably aluminium—, but also rails of plastic material can be used. The connecting bodies are preferably made of plastic material, but can also be made of spring steel.

What is claimed is:

1. A scissors-type connector for the roof support of a collapsible tent that has a pair of generally hollow roof rails occupying parallel planes within which they are rotatable relative to each other, each roof rail also having an inner wall with a circular opening therein, the connector comprising:

an elongated solid body of resilient material having formed thereon at a mid-point of its length a medium disc-shaped protrusion which extends outward perpendicular to its longitudinal axis for receiving the inner walls of the roof rails in spaced relation and in supporting engagement so that the respective ends of the solid body then extend into and through the wall openings of the corresponding rails;

the solid body further having formed thereon adjacent each side of the medium disc a plurality of circumferentially spaced ribs which extend radially outwardly and also longitudinally of the solid body for receiving the respective wall openings of the roof rails and supporting them in a centered relationship; and the solid body also having formed on each end thereof a spring member having circumferentially spaced spring fingers which extend inwardly toward the medium disc, each spring finger being disposed between two adjacent centering ribs, the inner ends of the spring fingers being adapted to be compressed by the roof rails when assembled onto the solid body, and the inner ends of the spring fingers also forming a plane parallel to the respective side of the medium disc so that the inner wall of the respectively associated rail may be secured therebetween.

2. A connector as in claim 1 wherein there are four ribs and four spring fingers on each end of the solid body.

3. In a collapsible tent, the apparatus comprising:

a pair of generally hollow roof rails occupying parallel planes within which they are rotatable relative to each other, each roof rail having an inner wall with an opening therein; and a scissors-type connector comprising:

an elongated solid body of resilient material having formed thereon at a mid-point of its length a medium disc-shaped protrusion which extends outward perpendicular to its longitudinal axis for receiving the inner walls of the roof rails in spaced relation and in supporting engagement so that the respective ends of the solid body then extend into and through the wall openings of the corresponding rails;

the solid body further having formed thereon adjacent each side of the medium disc a plurality of circumferentially spaced ribs which extend radially outwardly and also longitudinally of the solid body for receiving the respective wall openings of the roof rails and supporting them in a centered relationship; and the solid body also having formed on each end thereof a spring member having circumferentially spaced spring fingers which extend inwardly toward the medium disc, each spring finger being disposed between two adjacent centering ribs, the inner ends of the spring fingers being adapted to be compressed by the roof rails when assembled onto the solid body, and the inner ends of the spring fingers also forming a plane parallel to the respective side of the medium disc so that the inner wall of the respectively associated rail may be secured therebetween.

4. A connector as in claim 3 wherein there are four ribs and four spring fingers on each end of the connector body.

* * * * *